US007813971B2

(12) United States Patent
Mazzella et al.

(10) Patent No.: US 7,813,971 B2
(45) Date of Patent: Oct. 12, 2010

(54) METHOD OF GENERATING A RECOMMENDATION OR MAINTAINING A SUPPLY OF A TYPE OF COATING COMPOSITION CONSIDERING ENVIRONMENTAL CONDITIONS

(75) Inventors: Joseph F. Mazzella, Naperville, IL (US); Louis F. Holzknecht, Louisville, KY (US); Larry Porcellato, Akron, OH (US)

(73) Assignee: The Glidden Company, Strongsville, OH (US)

( * ) Notice: Subject to any disclaimer, the term of this patent is extended or adjusted under 35 U.S.C. 154(b) by 1151 days.

(21) Appl. No.: 11/339,345

(22) Filed: Jan. 25, 2006

(65) Prior Publication Data
US 2006/0271501 A1 Nov. 30, 2006

Related U.S. Application Data

(60) Provisional application No. 60/646,897, filed on Jan. 25, 2005, provisional application No. 60/687,473, filed on Jun. 3, 2005.

(51) Int. Cl.
G06F 17/30 (2006.01)
(52) U.S. Cl. ....................................................... 705/27
(58) Field of Classification Search .................. 705/26, 705/27
See application file for complete search history.

(56) References Cited

U.S. PATENT DOCUMENTS

| 4,924,450 | A | 5/1990 | Brashear et al. |
| 6,205,482 | B1 | 3/2001 | Navarre et al. |
| 7,571,122 | B2 * | 8/2009 | Howes ........................ 705/26 |
| 2001/0049592 | A1 | 12/2001 | Brunt et al. |
| 2002/0016676 | A1 | 2/2002 | Sann |
| 2002/0082753 | A1 | 6/2002 | Guskov et al. |
| 2002/0156770 | A1 * | 10/2002 | Krichilsky et al. ............. 707/3 |
| 2002/0193846 | A1 | 12/2002 | Pool et al. |
| 2003/0028408 | A1 | 2/2003 | RuDusky |
| 2003/0108228 | A1 | 6/2003 | Garnier |
| 2003/0149639 | A1 | 8/2003 | Stolakis et al. |
| 2004/0054579 | A1 | 3/2004 | Lamb et al. |
| 2004/0117358 | A1 | 6/2004 | von Kaenel et al. |
| 2004/0215483 | A1 | 10/2004 | Fixman |
| 2005/0011967 | A1 | 1/2005 | Skelton-Becker et al. |
| 2005/0234691 | A1 | 10/2005 | Singh et al. |
| 2005/0273358 | A1 | 12/2005 | Zimmerman |

OTHER PUBLICATIONS

Unknown author, "Brush Up On House Painting: Here's Plenty Of Advice On A Least-Favorite Warm-Weather Chore," San Francisco Examiner, San Francisco, CA, Jun. 14, 1995, p. Z1.*

(Continued)

Primary Examiner—Amee A Shah
(74) Attorney, Agent, or Firm—Timothy D. Meade

(57) ABSTRACT

A system and method are provided for recommending at least one coating composition for coating substrates considering the particular geographical location and the environmental conditions associated with that location. The computer based system and the method can also consider the particular performance and optionally the appearance features desired by the end user.

6 Claims, 4 Drawing Sheets

OTHER PUBLICATIONS

International Search Report for International application No. PCT/US06/02457 dated Sep. 25, 2007.

Written Opinion for International application No. PCT/US06/02457 dated Sep. 25, 2007.

"Data for wet chloride and wet sulfate deposition" http://nadp.sws.uiuc.edu/sites/ntnmap.asp, Aug. 2009.

Tutorial from www.duspec.com, May 18, 2005 (4 pages).

ISO 9223, "Corrosion of metals and alloys—Corrosivity of atmospheres—Classification," 1992, 19 pages.

ASTM D610, "Standard Practice for Evaluating Degree of Rusting on Painted Steel Surfaces," 6 pages.

* cited by examiner

Company Name [ ] * Address [ ] * City [ ] * State

-- Select a State -- ▼ * Zip Code [ ] * Service Item

-- Select a Substrate -- ▼ * Color

[2000] Aluminum Gray ▼ * Durability Range (Life Expectancy)

2-6 Years ▼ *

Gloss Level Semi-Gloss ▼ * Exposure Indoor/Interior ▼ * Interior Relative

Humidity > 50% No ▼ * Requires Certification No ▼ * Requires Zinc

Primer No ▼ * Corrosive Emissions Not Applicable ▼ * Major

Maintenance or New Construction -- Select Project Type -- ▼ * Submit Question

Fig. 3

Company Name [____] * Address [____] * City [____] * State

-- Select a State -- [▼] * Zip Code [____] * Service Item [____]

-- Select a Substrate -- [▼] * Color

[7460] Architectural Brown [▼] * Durability Range (Life Expectancy)

7-14 Years [▼] *

Gloss Level [High-Gloss] [▼] * Exposure [Outdoor/Exterior] [▼] * Interior Relative Humidity > 50% [Yes] [▼] * Requires Certification [Yes] [▼] * Requires Zinc Primer [Yes] [▼] * Corrosive Emissions [Localized Excessive Emissions] [▼] * Major Maintenance or New Construction [New Construction] [▼] * [Submit Question]

Fig. 4

METHOD OF GENERATING A RECOMMENDATION OR MAINTAINING A SUPPLY OF A TYPE OF COATING COMPOSITION CONSIDERING ENVIRONMENTAL CONDITIONS

This patent application claims benefit of U.S. Provisional Applications, with Ser. No. 60/646,897 filed Jan. 25, 2005 and the other with Ser. No. 60/687,473 filed Jun. 3, 2005. The entire contents of each of these afore-identified applications are hereby incorporated by reference.

This invention relates to a computer generated recommendation of a type of paint or coating composition and maintaining supplies of such paints or coating compositions for use based on climatic conditions at the location of use of the paint and coating composition. The recommendation and source of supply involves the durability of the paint or coating film and hence the frequency of application of the paint or coating composition considering the climatic conditions.

DESCRIPTION OF TECHNICAL CONSIDERATIONS

Films formed from various types of coating compositions such as paints in the industrial maintenance, marine, and even architectural markets and stains and varnishes are applied to surfaces of objects for decorative purposes and/or to protect the surfaces from the elements. These elements can be exterior weather related elements such as humidity or pH or corrosive materials in the atmosphere or water. Also these or similar elements can be encountered in interior environments within structures such as buildings and houses. Some coating compositions that form films based on evaporative or reactive chemistries require people skilled in the coatings area to make a recommendation of use of a particular coating composition to form a film that will last for a desired period of time in a particular environment. These skilled individuals know the various features of the various coating compositions such as the durability of the films of the compositions which makes one or more compositions better in particular environments. In this world of ever quickening pace and tempo, these skilled individuals may not be instantly available on a 24 hour and seven day a week basis to make coating recommendations. Having a system that would make such recommendations available on such a basis and even be capable of supplying the specifications for recommended coating compositions would offer this and additional advantages to users of coating compositions.

SUMMARY OF THE INVENTION

The present invention provides a system and a method for recommending one or more coating compositions or a combination of coating compositions for use on a substrate, structure, building, pipeline, bridge, facility and the like. The system and method provide the recommendation depending on the location of the use and the concomitant environmental conditions to which the dried and/or cured coating film will be exposed.

In one embodiment the method includes applying at least one classification of the more than one environment in which coating compositions form coating films on surfaces, providing a database of environmental data for a plurality of locations of use of coating compositions where the location and/or environmental data incorporates features of the classification, providing a data base of a plurality of coating compositions, and providing at least one parameter to match the data of a particular environment for a location with at least one coating composition to make a recommendation of at least one coating composition for a particular location having a particular environment.

In a particular embodiment of the invention the recommendation can include generation of the specification of the recommended coating composition to the user by electronic or paper communication. In particular the specification can be provided by the internet when the system existing as a web site on the world wide web or internet.

In another embodiment of the present invention the system is comprised of at least one central processing unit (CPU), an environmental conditions by location database operable with the CPU and comprising environmental conditions such as climatic conditions for a plurality of geographical locations; a coatings compositions database operable with the CPU comprising performance and appearance characteristics of a plurality of coating compositions; at least one input device operable to input the location of use of at least one coating composition along with at least one performance property desired and at least one appearance property desired for the coating film or paint. The CPU being programmed to: compare the inputted location with a plurality of environmental conditions to which a coating film will be exposed at that location and to select one or more coating compositions having performance characteristics to match the performance desired of a coating for the particular inputted location.

Of course the system of the present invention can also involve Storage Area Network (SAN) connecting data and components to other components. Also, network connections such as (e.g., Wide Area Network (WAN), Local Area Network (LAN), etc.) to system of the invention are a possibility that reside outside of the server system itself. As for the internet it is any global network of computers. One popular part of the Internet is know as the World Wide Web, or the "Web." The Web contains computers capable of displaying graphical and/or textual content or information. Computers that provide information on the Web are typically called "web sites." A website is defined by an Internet address referred to as a "URL" (uniform resource locator, e.g. http://www.specdoctor.com) that has an associated electronic page, often called a "home page." The URL has the access protocol of (http), the domain name (www.specdoctor.com) and optionally can include a path such as (www.specdoctor.com/digitalsitesurvey) to a file or resource residing on that server. Generally, a home page is an electronic document that organizes the presentation of one or more of such items as: text, graphical images, audio and video into a desired display. Of course as understood by those skilled in the art, where appropriate for the given state of computer hardware, existence of internal networks, and available software, other configurations of a network are possible including wireless networks.

In one embodiment, the present invention can be a Web-based system and method that utilizes HyperText Markup Language (HTML) to implement documents on the Internet together with a general-purpose secure communication protocol for a transport medium between the web-based system and the internet user. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the Web global information initiative since 1990. HTML is an application of ISO Standard 8879; 1986 Information Processing Text and Office Systems; Standard Generalized Markup Language (SGML).

Another approach for at least one embodiment of the present invention is with Java, where User Interface (UI) components can include custom items such as: real-time information, animated icons, and the like. Unlike HTML, Java supports the notion of client-side validation, offloading appropriate processing onto the client for improved performance. Dynamic, real-time Web pages can be created. Sun's Java language is defined as: "a simple, object-oriented, distributed, interpreted, robust, secure, architecture-neutral, portable, high-performance, multithreaded, dynamic, buzzword-compliant, general-purpose programming language. Java which has become an industry-recognized language for "programming the Internet supports programming for the Internet in the form of platform-independent Java applets." Java applets are small, specialized applications that comply with Sun's Java Application Programming Interface (API) allowing developers to add "interactive content" to Web documents (e.g., simple animations, page adornments, and the like). Applets execute within a Java-compatible browser (e.g., Netscape Navigator) by copying code from the server to user. From a language standpoint, Java's core feature set is based on C++. Sun's Java literature states that Java is basically, "C++ with extensions from Objective C for more dynamic method resolution."

Of course other technologies than JAVA known to those skilled in the art can be used such as Microsoft and ActiveX Technologies. ActiveX includes tools for developing animation, 3-D virtual reality, video and other multimedia content. The tools use Internet standards, work on multiple platforms, and these are being supported by more companies over time. The building blocks are called ActiveX Controls that are small and fast components that enable embedding of parts of software in hypertext markup language (HTML) pages. ActiveX Controls work with a variety of programming languages including Microsoft Visual C++, Borland Delphi, Microsoft Visual Basic programming system and Microsoft's development tool for Java. ActiveX Technologies also includes ActiveX Server Framework, allowing developers to create server applications.

In certain implementations of the invention, a server system is connected to one or more user systems via a network (e.g., the Internet). The server system performs many functions, including, for example: enabling user software to log into the server system and request and access data; uploading data from user software; retrieving and using data from a data store; generating data layers (e.g., spatially referenced images); sending data to the user software for display; and, handling various notifications to the user software (e.g., a notification regarding new data added to the data store).

The system of the present invention suitably provides browser support. In particular, the system software is a web-based application service provider (ASP) that supports, for example, the following browsers: Microsoft®. Internet Explorer® version 4.x and above and Netscape® 5.x and above.

The system can provide for and/or use or display content that can include: a technique for receiving spatial and tabular updates from a handoff to a third party system using an interface technique, such as Web Services (which is a standard, flexible connection technique to allow communication between disparate computer systems using Internet or similar network connection to transfer information and may be used to send XML messages). Moreover, the system may provide a spatial editor for modifying editable data elements (e.g., graphical objects or tabular data, and the like known to those skilled in the art), while the third party system may implement business rules for validating the editable data elements.

Also, the system may involve data compression (e.g., of image data) at run time during the data transformation stage. Compressing data is important because some data (e.g., GIS image data) cannot be accessed over the Internet due to the size of the data. For example, some image data is in a graphical data format called TIFF. TIFF, as understood by those skilled in the art, is a tag-based image file format that is designed to promote the interchange of digital image data. TIFF provides a multi-purpose data format and is compatible with a wide range of scanners and image-processing applications. TIFF format is device independent and is used in most operating environments, including Windows®, Macintosh®, and UNIX®. TIFF is a popular and flexible public domain raster file format. To be able to use GIS image data that may be transferred over the Internet, implementations of the invention convert large image data to a compressed data format, such as JPEG. There are many reasons for using the JPEG file format. JPEG permits a greater degree of compression than other image formats, such as TIFF, enabling quicker downloading times for larger graphics. Furthermore, JPEG documents appear to retain almost complete image quality for most photographs.

Another embodiment of the present invention is a method of doing business. The method comprises developing a first parameter correlating a location of use of the coating composition and a second parameter correlating to the external and/or internal environments of use of the coating composition, and a third parameter for ordering and stocking the coating compositions based on their frequency of use in the particular location. The methods can further include generating the quantity or volume of a particular recommended coating composition for a particular region based on the climatic data and stocking the quantity of coating composition for a plurality of locations based on the frequency of recommendations or the anticipated amount of use for a particular coating composition for each location.

Additionally, the present invention can include a coating application planner or scheduler. From the climatic data for a region of interest to a user, a forecast of the climatic conditions can be obtained to plan or schedule the most likely or an appropriate time of the year, month or day to apply a particular coating to a particular surface. Alternatively or additionally, the system of the present invention can predict optimum application dates and times based on the historical weather data trends as opposed to a forecast of the weather. For instance when the surface is of a building with a northern exposure, the system can generate times that are more appropriate for applying a recommended coating to achieve the desired coating life time. Such an approach can reduce the risk of premature failure of a coating on the substrate.

Such an approach can include climatic data on airborne pollutants such as those that contribute to acid rain and atmospheric pH. Also the coating recommendation based on the user provided information concerning the location of application of the coating can include coating compositions that are compliant with any VOC requirements for that location. Such a system is valuable to the property owners of substrates for coatings by providing choices for one or more coating compositions ranging from the most economical in the short term for the location to the longest lasting for the long term considering the durability and longevity of the coating system for the experienced exposure to the elements at the location of application of the coating composition. Additionally the method and system of the present invention once the location for the application of the coating is determined can provide one or more recommendations of one or more coating compositions for the climatic conditions of that location. Such a recommendation can include the labor rates in the location for contractors to apply the coating compositions.

BRIEF DESCRIPTION OF THE FIGURES

FIGS. 3 and 4 show alternative questionnaires capable of internet use for determining a recommendation of a coating composition based on climatic data for a particular location. Answering the several simple questions such as zip code, desired color, desired gloss and service life leads to a first major maintenance of the coating system. The Service life can be expressed in three different categories, 2-6 years, 7-14 years or greater than 14 years.

DETAILED DESCRIPTION OF THE INVENTION

Figure 1:
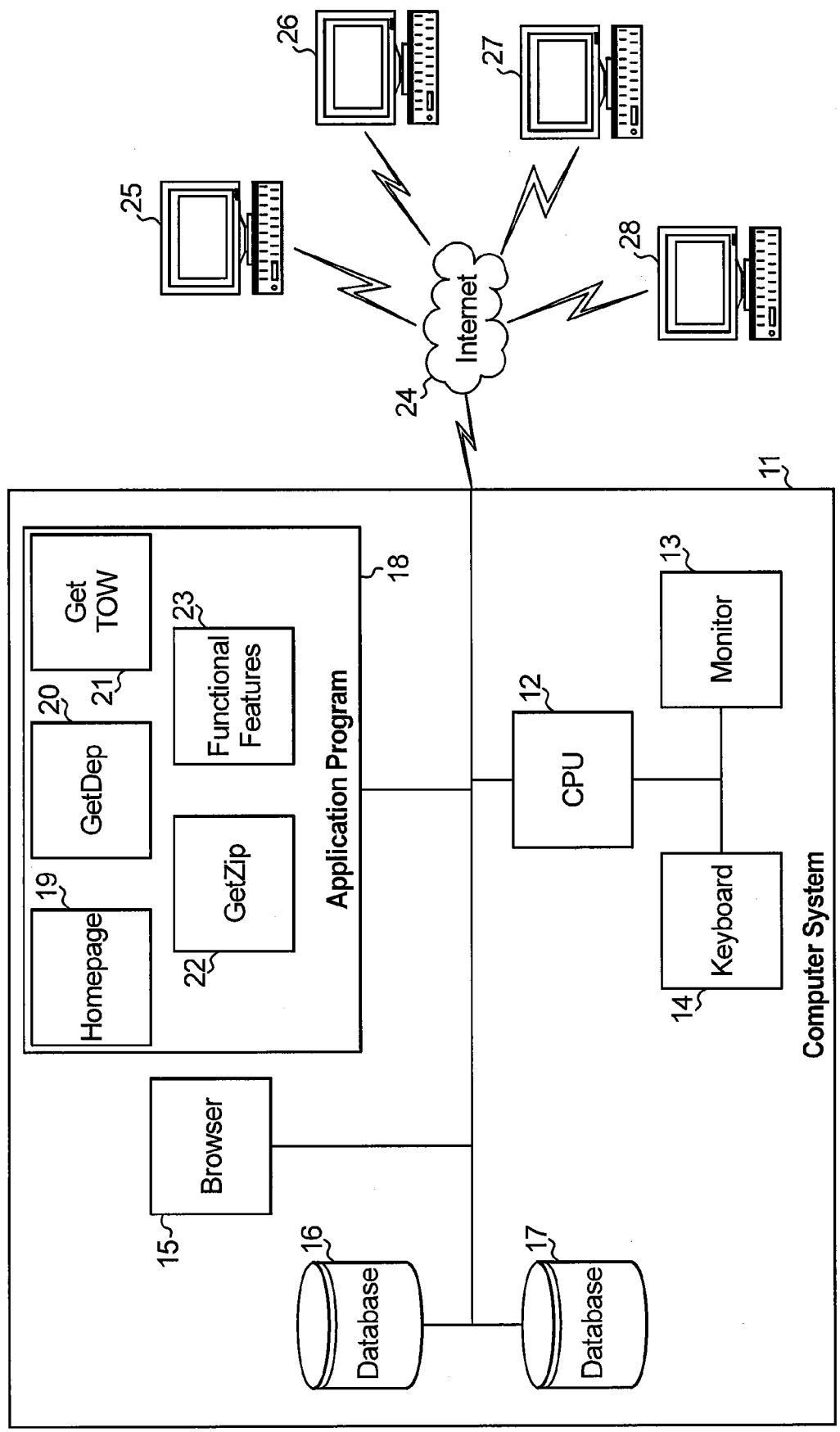
FIG. 1 is a schematic of one embodiment of the system of the present invention with a web site for the internet as in the input/output device to interact with the user to develop a recommendation for at least one coating composition.

In one embodiment of the present invention there is provided a prescriptive specification writing tool for Carbon Steel and Galvanized metal substrates, which is driven by an environmental classification system. The classification system can utilize climatic conditions such as weather data from a plurality of sources such as greater than 30,000 sources around the United States. Climatic information is gathered for airborne pollution such as acid rain (low pH factor) and/or corrosive ion content such as chloride ion and/or sulfate or sulfur dioxide ions. Also analyzed are general climatic conditions such as precipitation, humidity, and temperature The classification system can have the following categories:

SD 1 Category

Relatively benign atmospheric conditions. This can be associated with both a dry climate, and interior of a conditioned building—these are areas of low humidity, no atmospheric fall-out and neutral pH SD 2 Category Relatively benign atmospheric conditions. This can be associated with unheated buildings, more rural environments, these are areas of low to medium humidity minimal or no atmospheric fall-out and neutral pH.

SD 3—Category

Slightly aggressive, Light Industrial and urbanized environments. Higher humidity, and areas subject to airborne pollutants and atmospheric fall-out.

SD 4—Category

Aggressive Industrial and urbanized environments such as major Cities. High humidity, airborne electrolytes (Salts) and atmospheric fall-out promoting corrosion.

In addition other categories can be included even those that may not be related to the climatic data but incorporate user activity concerning the application of the coating product. A non-exclusive example would be a category such as SD 5—Category which could be_Highly aggressive Industrial environment, most often in close proximity to a large body of water. High humidity, airborne electrolytes (Salts) and atmospheric fall-out promoting aggressive corrosion.

In the alternative or as additional classification systems those of established standards setting organizations can be used with permission such as ISO 12944 standard. This dynamic tool, couples Government gathered data on National Air Pollution Deposition (NAPD) for atmospheric conditions with a matrix of generic coating systems and related ASTM testing procedures as outlined in the ISO standard. The outcome of the application of the classification system would be allowing the user to generate a coating specification, to include desired life expectancy, based on a classification of environments.

The use of NAPD and other data can simplify, what has been a very difficult process, and allows service environments to be determined by a simple input of a parameter of location of use such as for example Zip Code—or potentially Country Codes for those areas outside the USA. In essence, the ability to operate a computer, allows a user to obtain a coating recommendation regardless of aptitude in coatings and paints areas. Also additional features can be included in the selection of a coating composition such as color and gloss retention of product and UV stability, considering such factors of exposure for the applied coating as angle and/or color and/or generic grouping of the type of sunlight and the possibility or rate of fading of the color of the applied coating. Considering the rate of fading, it may be more economical to apply a protective clear coat over an applied coating than to try and match a faded color of a coating after a number of years of exposure of the coating.

Accordingly, coating compositions such as premium products for outdoor environments can populate the coating composition database that also have inherent traits for UV stability, i.e. Acrylics, and Aliphatic Polyurethanes. The system of the invention can also provide a classification system includes predictions for color and gloss retention based upon other factors such as mean sunlight in a particular geography.

Through atmospheric data gathered from NADP and National Oceanographic & Aeronautics Administration Association (NOA), the system of the invention is also able to generate coating systems for other than metal substrates based on ideal coating system per mean climate deposition and related substrate. This involves pH of substrate, moisture retention, General mean temperature and precipitation in a geo-coded area (service environment).

Through a simple questionnaire, the user will be able to input data similar to the form mechanism utilized for metals, with the output being the ideal coating system for longevity based on desired life expectancy. Life expectancy will be determined based on specific product, with a formula written to match product against service environment. Laboratory and empirical data will be analyzed in a manner to predict longevity of service.

A nonexclusive example of one type of structure or substrate that can be considered for coating with the present invention is a tank lining. Tank lining Systems are complex both in terms of determining exposure, longevity, and determined risk (liability). However, there is a way of dynamically generating specifications based on available intelligence in the system of the present invention.

The system of the present invention can also have a feature to provide preformatted guideline specifications for inclusion by Architects and Engineering firms with other CSI (Construction Specifications Institute Inc.) Divisional Specifications. The second part of this is to isolate specific components of a market which require painting, i.e. High Heat Stacks for the Power Market, Clarifiers for the Waste Water Market, etc.

... This involves a dynamic menu with a listing of commonly painted components for each market segment—then based on item and substrate, would allow the user with little coating knowledge to generate a coating system.

Quotation Tool for Applicators (Paint Contractors & Fabricators) can also be a feature of the system of the present invention.

The system can easily be modified to include fields for price, estimated square footage, VOC calculations and more. By inputting price, and based on specific product mix, the system can generate a price quotation. The output can be broken down by cost per square foot total, cost per mil square foot, and related expectancy (life-cycle-cost analysis)—this is to include both corrosion and UV stability of product. Already have this matrix worked out, would not be too difficult to produce this component of the system.

Other features and functionality can be included in the system and method of the present invention including Risk Assessment Component (Pictorial Site Survey—Extranet Program). Also the system and method can have a (Web Portal) for B2B commerce.

The same NAPD and other data which drives the system, allows the pictorial site survey to determine a related risk assessment factor—this involves rate of corrosion of carbon steel based on service environment. Coupled with current degree of corrosion, the system Pictorial Site Survey will be able to determine both desired maintenance cycles to First Major Maintenance (FMM). Further, if a current aggravated condition of the steel substrate shows a rapid rate of corrosion, the system will be able to assess risk to owner based on maintenance painting cycles. The intent of this as a selling tool is the show the owner if they do not paint "today", what it can cost tomorrow by delaying the necessary budget for painting to protect their facility.

This tool brings value to the user by allowing them to maximize the life-expectancy of their service item before degree of corrosion results in depletion to the point of costly full replacement. In addition, it allows the Owner to hold the money in the budget for painting with sound justification—the monies most often eliminated from a facilities budget is for maintenance painting. The intent of this tool is to keep monies in the paint budget and maximize account potential.

Another useful functionality for the system and method of the present invention is the inclusion of any standard productivity tool for obtaining and completing contacting jobs as are known to those skilled in the art.

In addition paint inventories by types of paints used in different locals can be predicted by the system of the present invention from the climatic data.

The climatic data can be historical average climate data alone or recent year-to-date measurements of climatic conditions or a combination of these. Additionally, short or long term forecast climate information can be incorporated into the system of the present invention. By supplementing historical average weather patterns with updated, actual weather conditions, the system can be sensitive to the current seasonal conditions, rather than just the average year conditions.

The method includes collecting data on environmental conditions for a plurality of locations. For example climatic data may be collected from a variety of sources, including weather services, such as the National Oceanic Administration Weather Service, or a comparable public or private weather service, or climate data reporting network. Historical climatic data is often provided by weather services on a monthly basis for a geographic region.

The present invention can supplement historical weather data with actual measured data for the year by apportioning climatic data according to the period of time in which it was collected. The actual measured data for the year can be collected through the same kinds of weather services, or collected on site by a consumer, or a service provider. Thus the present invention involves using local climatic data retrieved from a variety of sources such as the National Oceanic and Atmospheric Administration, NOM, actual measured data for specific small locations, local weather reporting, state wide weather reporting, regional weather reports, and measured data and historical and predicted weather data spanning time periods of the order of one or two weeks to thirteen months. The weather data can be collected for large or small areas, and may be site specific.

In this method the data can be categorized according to the source and nature of the data, i.e. whether the data is real-time or current measure data, historical average data for that area, or forecasted data. The real-time or current measure data are data specific for the current season or year, as determined from weather reporting services or actual weather measurements, such as temperature, humidity, and precipitation. Other types of climate measurements include wind and soil moisture data.

The historical average data represents the "average" year weather for a given period of time, i.e. a specific week of the year, for a given geographical location. Historical average data may vary in how many years of weather measurements are included, as well as the size of the geographical area represented. In some cases, historical average data may be accumulated through local weather records, or through records collected at a specific site. Such data collected over time, may be averaged on a monthly, weekly, or daily basis to provide a historical average data set at the desired location.

The forecast data set is collected from weather forecasting services, which provided predicted weather conditions. These forecast data may be short-term or long-term predictions.

Modifications may be necessary to some of the available software to facilitate entry of historical, real-time and/or forecast data, but the modeling algorithms remain functional for the present invention. In such cases, the spreadsheets will be programmed to provide functions or algorithms that allow for analyzing the correlations between the climatic data and the coating composition properties. These functions and algorithms may provide various degrees of sophistication in generating estimation models. Spreadsheet and modeling programs used according to the present invention correlate climatological data to coating durability projections.

The system and method of the present invention would allow professional engineers, working in different US locations, to assess how to achieve the desired longevity of coatings. By providing this service, painters and engineers who have a formal requirement for corrosion assessment obtain recommendations for coating compositions suitable for their needs because they can provide justification of their assessments.

1. A nonexclusive example of programming for the system and method of the present invention is that which can support the acquisition and preparation of data and logic behind the specifications for coating compositions, allow for updates and improvements to the specification generation methods. The programming can be based on algebraic calculation and a data look-up. Three components of such an approach include:

a) The definition and creation of the data sources against which the system and method of the present invention creates its recommendations.

b) The recommendation service, which receives the user input, calculates classification and returns the result; and c) The interactive input device of a website.

Sources for the data required for calculating the environmental classifications for use in coating substrates such as metals comprise deposition data, weather data and geographical data relating map location to zip code. A number of tools to assist with this process can share programming components where appropriate. The approach of keeping the tools separate allows for flexibility to enhance functionality.

Deposition Data:

Data for wet chloride and wet sulfate deposition for all locations for 2003 can be downloaded from http://nadp.sws.uiuc.edu/sites/ntnmap.asp. This data can be used to prove the new system against the benchmark list of classifications for 90 zip codes. A stand-alone application, such as GetDep, can read the formatted data, including latitude and longitude, and create a table of deposition values against zip code. GetDep can be reusable, for ease of updating a different years data such as that for 2004 data to be downloaded and used on the site without additional programming. GetDep can also be extensible to allow easy extension to pick up and format other deposition species and pH where needed.

Time of Wetness:

Hourly weather data for all US Weather stations can be purchased on DVD for entire calendar years. Alternatively the data can be downloaded from specific station information from the US Weather service website. A stand-alone application, GetTOW, will be designed and implemented, which reads the formatted data, including latitude and longitude of the sites. It will aggregate the data, calculating the Time of Wetness for each station (the number of hours per year that the relative humidity is >80% and the air temperature is >32 F (0 C)). GetTOW will output the data as a table of TOW against zip code. The application will be reusable, so that if ICI require the 2004 data to be used, no additional development work will be required. GetTOW will also be extensible, allowing the output table to be extended to include precipitation and temperature data if the requirement arises.

Zip Codes:

There are options for deriving five-digit zip codes from latitude and longitude values, and for identifying neighboring zones for zip codes that have no associated data point (to support interpolation of data). This can involve automating an interface to an existing website (e.g. USPO) or having a stand-alone tool GetZip, which can be called from other applications.

Classification Model:

A stand-alone application can generate the classification spreadsheet using the data for Deposition, Time of Wetness and Zip locality, which is output from the utilities described above. The model can be based on the known standards, but the implementation canl include hooks to allow additional parameters to be incorporated.

With the data sourced, and the tools created to manipulate it, the data are organized in an accessible form for the system and method of the present invention. For example spreadsheets or comma separated files can be used that provide a unified list that relates the environmental classification for each zip code to the performance characteristics and treatment recommendations for a variety of possible combinations of user conditions. The website allows for access to the classification information by querying the Classification Spreadsheet. Suitable equipment for running the data manipulation tools (GetDep, GetTOW and GetZip) can have a minimum specification of 1 GHz Pentium processor, 512 Mb Memory and running Windows XP or 2000 Professional. Suitable versions of the operating system and development software can be:

| Software | Version |
| --- | --- |
| Windows NT Workstation | 4.0 with Service Pack 6 |
| Windows 2000 Professional | With Service Pack 4 |
| Windows XP Professional | 2002 with Service Pack 1 |
| Visual Studio .NET | 2003 |

Also the dynamic specification writing program can have many projected functions/features:

Dynamic Specifications for Metals

Specifications by other than metal substrates, i.e. Concrete, Masonry, Wood, etc.

Specifications for Tank Lining Systems

Specifications by Market, i.e. CSI and Snapshot (mini) Specifications

Quotation Tool for Contractors (Paint Contractors & Fabricators), and

Risk Assessment Component (Pictorial Site Survey—Extranet Program)

The Dynamic Specification Generation Tool represents a major break through in the difficult process of choosing the appropriate high performance coating system for a particular environment. As a tool, it simplifies the system selection process and answers the question everyone has been asking for years—How long will my coating system last (service life).

As a foundation, the Tool can use climatic data from around 30,000+ weather stations across the country using a proprietary software. Building on this foundation the Tool then factors in various air pollutant species that contribute to acid rain and atmospheric pH. Factor in various atmospheric electrolytes and the Tool estimates the corrosion potential of the macro environment to generate a corrosion potential level, SD-1 through 4. This corrosion potential level is then neatly tied directly to US postal zip code locations.

It should be understood that in the context of the Tool, the term "durability" and "life expectancy" are defined as the expected life of a protective paint system to the first major maintenance painting. The level of coating failure before the first major maintenance painting can be assessed in accordance with recognized corrosion estimation standards such as ASTM D610 or ISO 4628-3.

The durability range generated by the Tool is not a "guarantee time". Durability is a technical consideration that can aid an owner in establishing a maintenance program. The guarantee time is usually shorter than the durability time. There are no rules that link the two periods of time. Maintenance of a coating system is often required at more frequent intervals than the durability time because of fading, chalking, contamination or wear and tear or for aesthetic or other reasons.

One particular embodiment of the present invention is coating composition specification software. An architect, builder or any other professional materials specifier, through the system of the present invention on a Website is enable to easily generate painting specifications for building projects for architecturally exposed metals. These painting specifications will help to guide the contractors, and make a high performance coating recommendation with little knowledge of protective coatings.

FIG. 1 illustrates an embodiment of the computer network system for practicing the present invention on line. The system includes a computer system 11. The computer system 11 includes a central processing unit (CPU) 12 for processing data and program instructions. The computer system 11 also includes input and output devices, as is well known in the art. For example, the computer 11 can include a display screen or monitor 13, a keyboard 14 of course a mouse (not shown) can also be included as well as a printer (not shown), and the like as known to those skilled in the art. The computer system 11 further can include data storage and memory devices, as are known in the art, for storing a environmental conditions by location database 16, an coating compositions database 17, an application program 18 and a browser 15. The environmental conditions by location database 16 is used to store and manage the environmental conditions and location data. For instance such data can included the climatic conditions by Zipcode in the United States and by other geographical indicators or classifications for other countries. The environmental data can also include atmospheric conditions inside building or structures where coatings are used on substrates inside these structures. The coatings composition database 17 is used to store at least the performance properties and optionally the appearance properties of the plurality of coating compositions. Also this database or a separate database can be store the specifications for the coating compositions. Additional databases can be included to store the additional features referred to above that can be included in the system. The databases 16 and 17 can be relational databases, as are well known in the art. The computer system 11 as web server is connected to a network 24, which serves as a communications medium with a plurality of user computers indicated by computers 25, 26, 27, and 28. However there can be any number of users.

In presently preferred embodiments of the invention, the network 24 comprises the Internet. The Internet is a global network of computers. One popular part of the Internet is the World Wide Web, or the "Web." The World Wide Web contains computers that display graphical and textual information. Computers that provide information on the World Wide Web are typically called "web sites." A website is defined by an Internet address that has an associated electronic page, often called a "home page." Generally, a home page is an electronic document that organizes the presentation of text, graphical images, audio and video into a desired display. Upon reading this specification, those skilled in the art will now understand that, under appropriate circumstances, considering issues such as developments in computer hardware, software and connectivity, etc., other network configurations and devices also may suffice, such as for example, PDAs connected via a wireless network, etc.

Still referring to FIG. 1, the computer system 11 is configured according to a preferred embodiment of the invention to include a web server for hosting a website, which includes a homepage 19 which can include modules for user registration and login, and for online data entry. Upon reading this specification, those skilled in the art will understand that, under appropriate circumstances, considering issues such as user preference, services offered by website manager, market demand, subject area, and the like, other functional modules may be included, such as those for the additional functional features mentioned above. Also the application program 18 can include the software for GetDep 20, Get TOW 21, GetZip 22, and other functional features as mentions above at 23. The application program 18 is operable with databases 16 and 17 to provide the functionality that will now be described.

Figure 2:
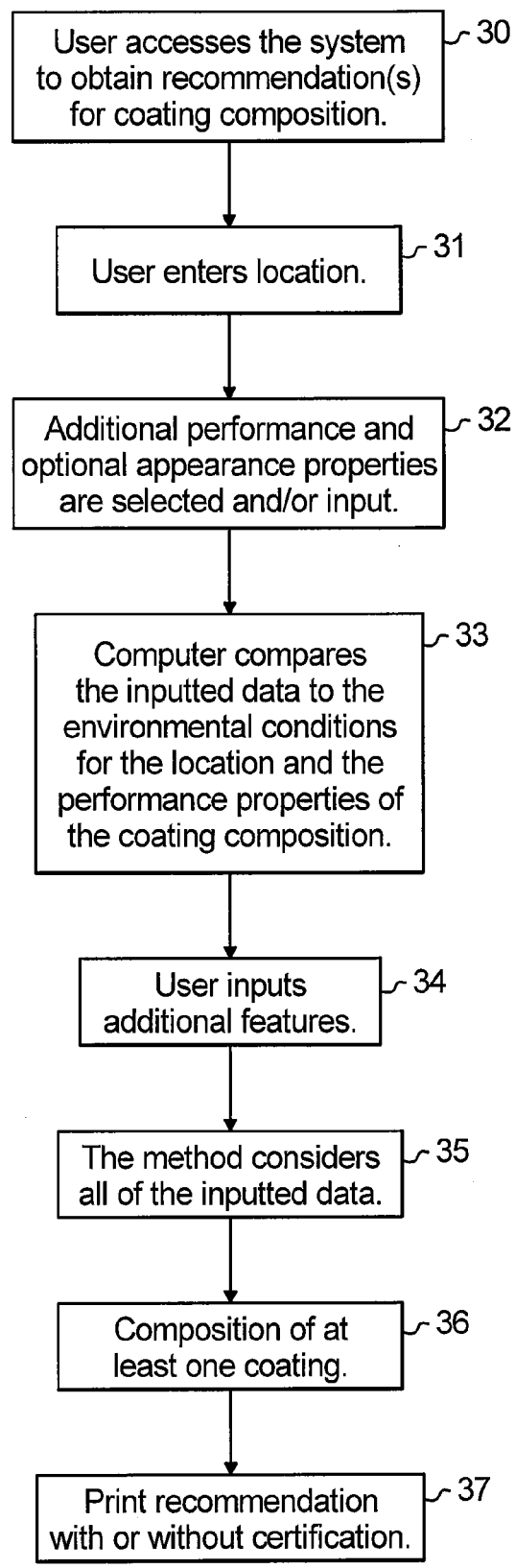
FIG. 2 is a schematic of one embodiment of a method for interacting with the user to provide the recommendation for at least one coating composition considering the location of use of the coating. The method interacts through the questionnaire as shown in FIGS. 3 and 4.

The method of the present invention is depicted schematically in FIG. 2 with reference to the questionnaires of FIGS. 4 and 5. The user accesses the system to interact to obtain the recommendation for at least one coating composition at 30. The user through the input questionnaire as shown in FIG. 3 or 4 enters the location for the use of the coating at 31 along with a main performance characteristic such as the duration or the life of the coating that is desired. Additional performance properties and optionally appearance properties for the coating can be selected or inputted at 32. The computer compares at 33 the inputted data to the environmental conditions for the location and the performance properties of the coating composition. If the user desires additional features of the method such as certification of the coating composition and the like as disclosed above these can be inputted now at 34. The method considers all of the inputted data for the user at 35 to recommend at least one coating composition at 36. The recommendation can be printed at 37 with or without the certification.

We claim:

1. A method for recommending coating compositions from the use of the climatic conditions from the location of application to surfaces, comprising:

applying, by a computer system, at least one classification of more than one environment in which more than one coating composition form coating films on surfaces, providing, by the computer system an environmental conditions database including climatic data for a plurality of locations of use of coating compositions where the climatic data incorporates features of the classification, providing, by the computer system, a coatings composition database including performance properties of a plurality of coating compositions, receiving, by the computer system, information from a user including a location of use of a desired coating composition and a desired performance property of the desired coating composition, matching, by the computer system, the climatic data in the environmental conditions database for the particular environment at the user location of use with at least one coating composition having the user desired performance property at the location, based on the performance properties data of the coatings composition database, and presenting to the user, by the computer system, the matched at least one coating composition as the at least one recommended coating composition for the user location.

2. The method according to claim 1 wherein said climatic data is selected from historical average, real-time and forecast climatic data supplied from a weather service provider.

3. The method according to claim 2 wherein said weather service provider is the National Oceanic Administration Weather Service or a comparable public or private weather service or climate data reporting network.

4. A system for recommending coating compositions from the use of the climatic conditions from the location of application to surfaces, comprising a computer system programmed to perform steps comprising:

applying at least one classification of the more than one environment in which more than one coating composition form coating films on surfaces, providing an environmental database including climatic data for a plurality of locations of use of coating compositions where the climatic data incorporates features of the classification, providing a coatings compositions database including performance properties of a plurality of coating compositions, receiving information from a user including a location of use of a desired coating composition and a desired performance property of the desired coating composition.

matching the climatic data in the environmental conditions database for the particular environment at the user location of use with at least one coating composition having the user desired performance property at the location, based on the performance properties data of the coatings composition database, and presenting to the user the matched at least one coating composition as the at least one recommended coating composition for the user location.

5. The system according to claim 4 wherein said climatic data is selected from historical average, real-time and forecast climatic data supplied from a weather service provider.

6. The system according to claim 5 wherein said weather service provider is the National Oceanic Administration Weather Service or a comparable public or private weather service or climate data reporting network.

* * * * *